(12) United States Patent
Kim et al.

(10) Patent No.: US 6,803,551 B2
(45) Date of Patent: Oct. 12, 2004

(54) COOKING VESSEL USED WITH MICROWAVE OVENS

(75) Inventors: Hyang-Ki Kim, Suwon (KR); In Ki Jeon, Suwon (KR); Sung Kwang Kim, Ansan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/390,023

(22) Filed: Mar. 18, 2003

(65) Prior Publication Data

US 2004/0094544 A1 May 20, 2004

(30) Foreign Application Priority Data

Nov. 15, 2002 (KR) ................................ 10-2002-0071013

(51) Int. Cl.[7] ................................................ H05B 6/80
(52) U.S. Cl. ........................ 219/731; 219/729; 219/734
(58) Field of Search ................................ 219/678, 682, 219/681, 687, 725, 731, 732, 734, 735, 728–730; 99/DIG. 14; 426/103, 113, 234, 243

(56) References Cited

U.S. PATENT DOCUMENTS 4,317,017 A  2/1982  Bowen ........................ 219/731
4,413,167 A * 11/1983  Martel et al. ................ 219/729
4,922,071 A *  5/1990  Samford ...................... 219/728

FOREIGN PATENT DOCUMENTS

GB  1 071 608     6/1964
GB  2 246 949 A   2/1992

* cited by examiner

Primary Examiner—Tu Hoang
(74) Attorney, Agent, or Firm—Staas & Halsey LLP

(57) ABSTRACT

A cooking vessel used with microwave ovens, which produces steam through a microwave heating method and cooks food using the steam. The cooking vessel includes a lower body containing water therein and made of a microwave permeable material. A food supporting plate is seated, at its edge, on an upper edge of the lower body in such a way as to be spaced apart from a bottom of the lower body, and is made of a microwave blocking material. A plurality of perforations are formed on the food supporting plate to allow steam to pass. A lid covers the lower body, and is made of a microwave blocking material. A steam discharging hole is formed on the lid. The lid is seated at its lower edge on the upper edge of the lower body in such a way that the lower edge of the lid is spaced apart from the edge of the food supporting plate by a predetermined interval, thus allowing a predetermined amount of microwaves to penetrate into the lid.

8 Claims, 3 Drawing Sheets

COOKING VESSEL USED WITH MICROWAVE OVENS

CROSS-REFERENCE TO RELATED APPLICATIONS

This application claims the benefit of Korean Application No. 2002-71013, filed Nov. 15, 2002, in the Korean Intellectual Property Office, the disclosure of which is incorporated herein by reference.

BACKGROUND OF THE INVENTION

1. Field of the Invention

The present invention relates, in general, to a cooking vessel used with microwave ovens and, more particularly, to a cooking vessel which is laid in a cooking cavity of a microwave oven to cook food using steam.

2. Description of the Related Art

As is well known to those skilled in the art, a microwave oven is an appliance which cooks food laid in its cooking cavity using microwaves irradiated from a magnetron into the cooking cavity. Typically, an electric heater cooks food by heating the surfaces of the food, but the microwave oven cooks food by heating the interior of the food through a dielectric heating method. That is, when microwaves irradiated from the magnetron of the microwave oven cause the molecules of moisture laden in food to vibrate, frictional heat is generated within the food, thereby cooking it.

However, such a conventional microwave oven is problematic in that food is cooked by frictional heat generated when microwaves irradiated from the magnetron cause the molecules of moisture laden in the food to vibrate, so moisture is removed from the food during a cooking process, thus deteriorating the taste and appearance of food. The conventional microwave oven has another problem in that it is difficult to cook steamed food to which water must be added during cooking.

SUMMARY OF THE INVENTION

Accordingly, it is an aspect of the present invention to provide a cooking vessel used with microwave ovens, which produces steam through a microwave heating method and rapidly steams food using the steam.

Additional aspects and advantages of the invention will be set forth in part in the description which follows and, in part, will be obvious from the description, or may be learned by practice of the invention.

The foregoing and/or other aspects of the present invention are achieved by providing a cooking vessel used with microwave ovens, including a lower body containing water therein and made of a microwave permeable material, and a food supporting plate seated, at an edge thereof, on an upper edge of the lower body in such a way as to be spaced apart from a bottom of the lower body and made of a microwave blocking material, with a plurality of perforations being formed on the food supporting plate to allow steam to pass therethrough. The cooking vessel of the present invention also includes a lid which covers the lower body and is made of a microwave blocking material. A steam discharging hole is formed on the lid. In this case, the lid is seated at a lower edge thereof on the upper edge of the lower body in such a way that the lower edge of the lid is spaced apart from the edge of the food supporting plate by a predetermined interval, thus allowing a predetermined amount of microwaves to penetrate through the lid.

Further, a first step is provided along the upper edge of the lower body to support the edge of the food supporting plate, and a second step is provided along the upper edge of the lower body at a position higher than the first step to support the lower edge of the lid, which has a cross sectional area larger than a surface area of the food supporting plate. Thus, the food supporting plate and the lid are supported on the upper edge of the lower body in such a way as to be spaced apart from each other at the edges thereof.

In an aspect of the present invention, the interval between the edge of the food supporting plate and the lower edge of the lid is set to 5 mm or less.

At least one depression having a predetermined depth is formed on the food supporting plate, thus allowing spherical food items, such as eggs, to be easily laid on the food supporting plate.

In another aspect of the invention, each of the perforations which are provided on the food supporting plate is 1.8 mm in diameter.

Further, a cooking vessel used with microwave ovens includes a lower body containing water therein and designed to allow microwaves to penetrate the lower body, and a food supporting plate provided in the lower body in such a way as to be spaced apart from a bottom of the lower body and designed to allow steam to penetrate the food supporting plate while preventing microwaves from penetrating the food supporting plate. A lid engages with the lower body to define a cooking space along with the food supporting plate, and is designed to prevent microwaves from penetrating the lid. A microwave penetrating part is provided on the lower body between the lid and the food supporting plate.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
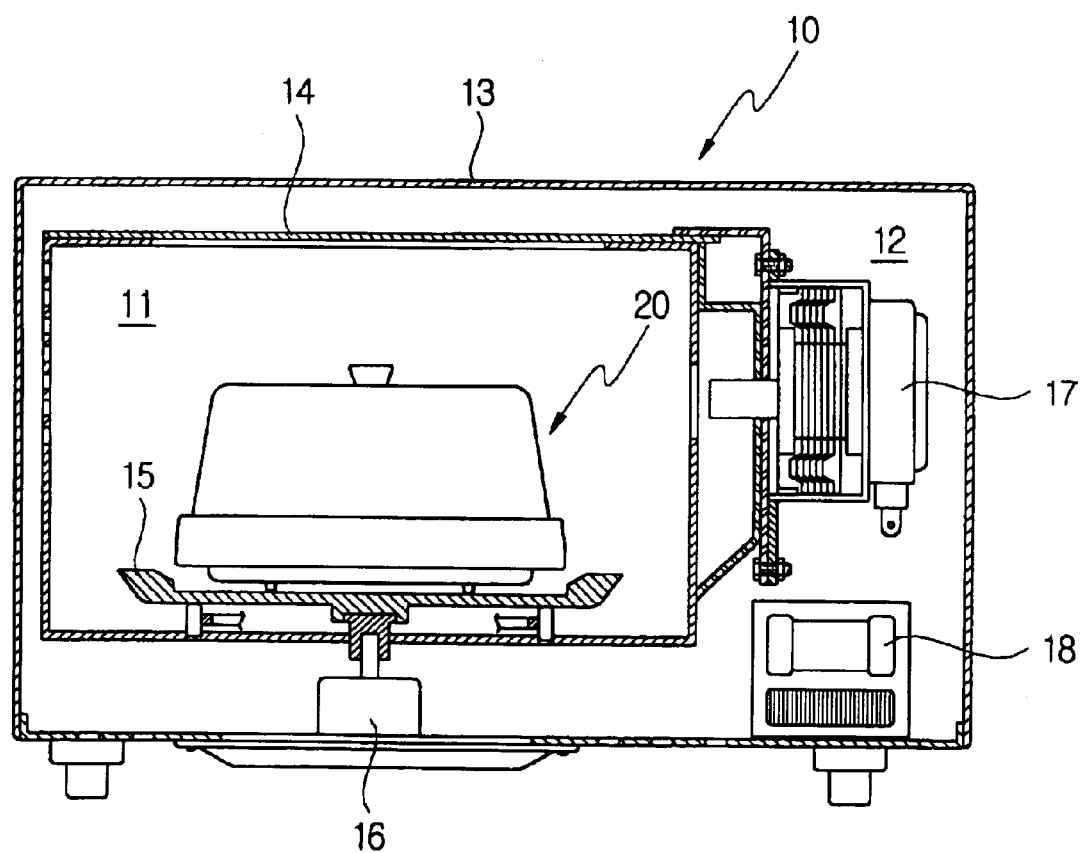
FIG. 1 is a sectional view illustrating a microwave oven in which a cooking vessel is laid, according to an embodiment of the present invention.

Reference will now be made in detail to the preferred embodiments of the present invention, examples of which are illustrated in the accompanying drawings, wherein like reference numerals refer to like elements throughout. The embodiments are described below in order to explain the present invention by referring to the figures.

As illustrated in FIG. 1, a microwave oven in which a cooking vessel is laid includes a cabinet 10. The cabinet 10 is partitioned into a cooking cavity 11 and a machine room 12. Food to be cooked is laid in the cooking cavity 11. Several electrical devices are installed in the machine room 12. Further, the cabinet 10 is designed such that an inner casing 14 defining the cooking cavity 11 is provided in an outer casing 13, thus partitioning the cabinet 10 into the cooking cavity 11 and the machine room 12.

A cooking tray 15 is rotatably mounted to a bottom of the cooking cavity 11. Food to be cooked through a microwave heating method is laid on the cooking tray 15 inside the cooking cavity 11. A motor 16 is installed in the space between the bottom of the cooking cavity 11 and the bottom of the outer casing 13 under the cooking cavity 11 to rotate the cooking tray 15. A magnetron 17 and a high-voltage transformer 18 are installed in the machine room 12. The magnetron 17 irradiates microwaves into the cooking cavity 11, and the high-voltage transformer 18 applies high-voltage to the magnetron 17. Such a construction allows food laid on the cooking tray 15 provided in the cooking cavity 11 to be cooked using microwaves irradiated from the magnetron 17.

Figure 2:
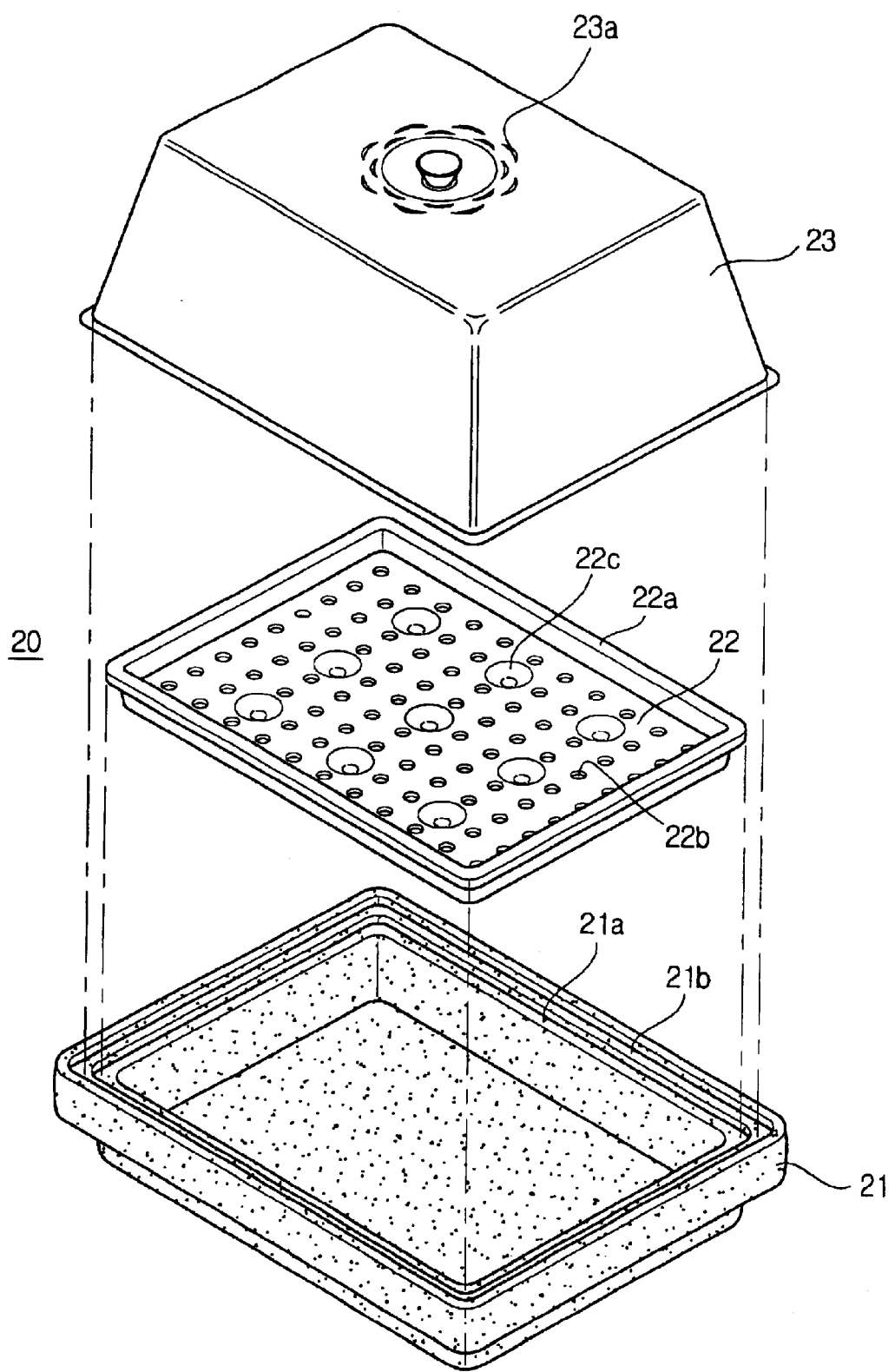
FIG. 2 is an exploded perspective view illustrating the cooking vessel shown in FIG. 1 and used with microwave ovens.
Figure 3:
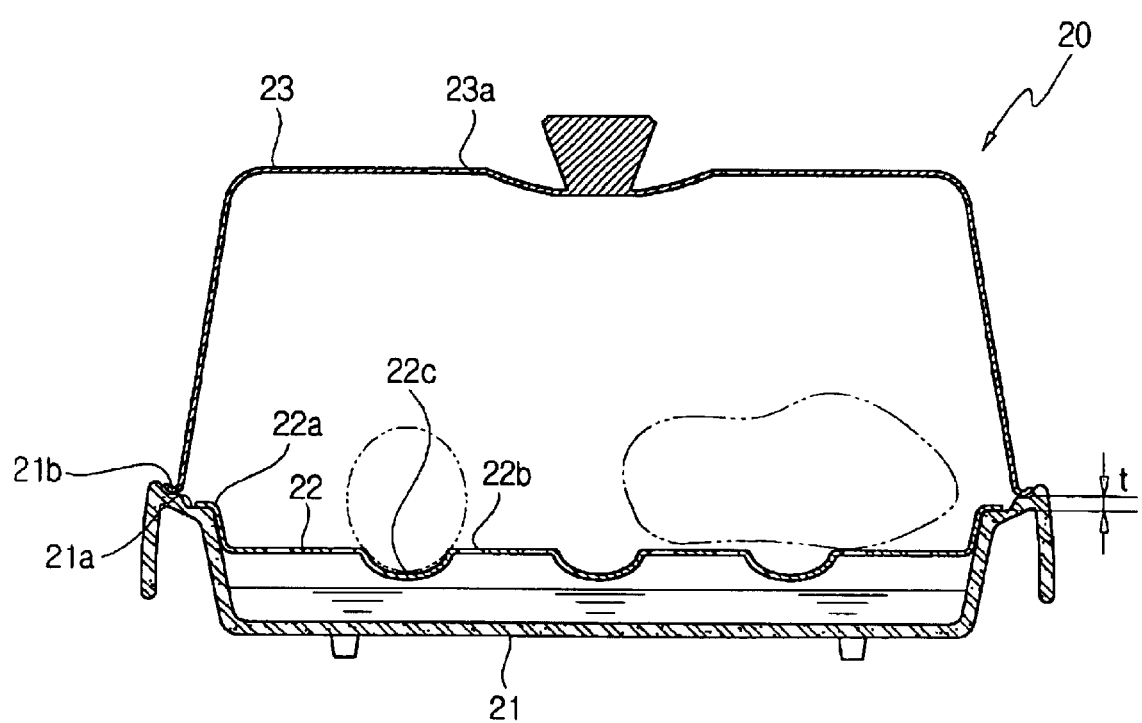
FIG. 3 is a sectional view illustrating the cooking vessel shown in FIG. 1 and used with microwave ovens.

A cooking vessel 20 is provided in the cooking cavity 11 of the microwave oven to steam food. As illustrated in FIGS. 2 and 3, the cooking vessel 20 includes a lower body 21, a food supporting plate 22, and a lid 23. The lower body 21 contains water therein. The food supporting plate 22 is seated on an upper edge of the lower body 21. The lid 23 covers the lower body 21.

The lower body 21 is made of a microwave permeable material, such as glass, ceramic, or a heat-resisting resin, so that water contained in the lower body 21 is heated by microwaves which are irradiated into the cooking cavity 11. The food supporting plate 22 and the lid 23 are made of metal to block microwaves.

A flange 22a is provided along an edge of the food supporting plate 22. The flange 22a of the food supporting plate 22 is seated on the upper edge of the lower body 21 in such a way that the food supporting plate 22 is spaced apart from a bottom of the lower body 21. A plurality of perforations 22b are formed on the food supporting plate 22, so that steam produced from water heated by microwaves passes through the food supporting plate 22. It is preferable that each perforation 22b is about 1.8 mm in diameter and an interval between neighboring perforations 22b is also about 1.8 mm, thus allowing steam to pass through the food supporting plate 22 but preventing microwaves from passing through the food supporting plate 22. Although not illustrated in the drawings, each perforation 22b may be 1.8 mm×9 mm in size.

As illustrated in FIGS. 2 and 3, a plurality of depressions 22c each having a predetermined depth are formed on the food supporting plate 22, thus allowing spherical food items, such as eggs, to be stably laid on the food supporting plate 22 without being unexpectedly moved. Preferably, each depression 22c has a curved inner surface to stably hold such spherical food items.

The lid 23 is opened at its lower portion to cover food laid on the food supporting plate 22. An opening formed at the lower portion of the lid 23 has a size which is similar to an opening formed at an upper portion of the lower body 21. The lid 23 is seated, at its lower edge, on the upper edge of the lower body 21 in such a way that the lower edge of the lid 23 is spaced apart from the flange 22a of the food supporting plate 22 by a predetermined vertical interval 't'. For such an arrangement, a first step 21a is provided along the upper edge of the lower body 21 to support the flange 22a of the food supporting plate 22. A second step 21b is provided along a portion outside the first step 21a to be higher than the first step 21a, and supports the lower edge of the lid 23 which has a cross sectional area larger than a surface area of the food supporting plate 22. In this case, the vertical interval 't' between the first step 21a and the second step 21b is set to 5 mm or less so that the interval between the upper edge of the food supporting plate 22 and the lower edge of the lid 23 is kept within 5 mm.

Such a construction allows food laid on the food supporting plate 22 to be cooked by steam which is produced from water contained in the lower body 21 under the food supporting plate 22, and by a predetermined amount of microwaves which penetrate into the lid 23 through the interval 't' which is defined between the edge of the food supporting plate 22 and the lower edge of the lid 23, thus allowing the food to be more rapidly and effectively cooked. According to the present invention, since the interval 't' defined between the edge of the food supporting plate 22 and the lower edge of the lid 23 is limited within 5 mm, only a limited amount of microwaves penetrate into the lid 23 while steaming food, thus allowing food to be rapidly cooked while maintaining a characteristic taste of steamed food.

A plurality of steam discharging holes 23a are formed on the lid 23. In this case, each steam discharging hole 23a has a size which allows steam to be discharged to the outside and prevents microwaves from being penetrated into the lid 23.

The method of cooking food using the cooking vessel used with microwave ovens according to the present invention will be described in the following.

When one desires to steam food using the cooking vessel 20, as illustrated in FIG. 3, a predetermined amount of water is contained in the lower body 21, and the food supporting plate 22 is seated on the lower body 21. Next, food to be steamed is laid on the food supporting plate 22, and then the lid 23 is closed. Thereafter, the cooking vessel 20 is put into the cooking cavity 11 of the microwave oven to cook the food laid in the cooking vessel 20, as illustrated in FIG. 1.

When the microwave oven is operated in such a state, microwaves are irradiated from the magnetron 17 into the cooking cavity 11. Microwaves irradiated into the cooking cavity 11 pass through the lower body 21 to heat water contained in the lower body 21. At this time, steam is produced from the water in the lower body 21. The food laid on the food supporting plate 22 is heated and cooked by the steam. While steaming the food as such, a predetermined amount of microwaves, penetrating into the lid 23 through the interval 't' which is defined between the lower edge of the lid 23 and the edge of the food supporting plate 22, directly heats the food laid in the cooking vessel 20, thus more rapidly cooking the food.

As is apparent from the above description, the present invention provides a cooking vessel used with microwave ovens, which is designed to produce steam using microwaves irradiated into a cooking cavity of a microwave oven, thus allowing food to be easily steamed.

Further, the present invention provides a cooking vessel used with microwave ovens, which is designed such that a predetermined amount of microwaves penetrate into an interval defined between a food supporting plate and a lid which are made of a microwave blocking material, thus heating food laid in the cooking vessel using both steam and a predetermined amount of microwaves, therefore allowing food to be rapidly cooked while maintaining a characteristic taste of steamed food.

Although an embodiment of the present invention have been shown and described, it would be appreciated by those skilled in the art that changes may be made in this embodiment without departing from the principles and spirit of the invention, the scope of which is defined in the claims and their equivalents.

What is claimed is:

1. A cooking vessel used with microwave ovens, comprising:
   a lower body containing water therein, and made of a microwave permeable material;

a food supporting plate seated, at an edge thereof, on an upper edge of the lower body in such a way as to be spaced apart from a bottom of the lower body, and being made of a microwave blocking material, with a plurality of perforations being formed on the food supporting plate to allow steam to pass therethrough; and a lid covering the lower body and made of a microwave blocking material, with a steam discharging hole being formed on the lid, wherein the lid is seated at a lower edge thereof on the upper edge of the lower body in such a way that the lower edge of the lid is spaced apart from the edge of the food supporting plate by a predetermined interval, thus allowing a predetermined amount of microwaves to penetrate into the lid.

2. The cooking vessel according to claim 1, further comprising a first step provided along the upper edge of the lower body to support the edge of the food supporting plate, and a second step provided along the upper edge of the lower body at a position higher than the first step to support the lower edge of the lid which has a cross sectional area larger than a surface area of the food supporting plate, wherein the food supporting plate and the lid are supported on the upper edge of the lower body in such a way as to be spaced apart from each other at the edges thereof.

3. The cooking vessel according to claim 1, wherein the interval between the edge of the food supporting plate and the lower edge of the lid is set to 5 mm or less.

4. The cooking vessel according to claim 1, wherein at least one depression having a predetermined depth is formed on the food supporting plate, thus allowing spherical food items to be laid in the at least one depression.

5. The cooking vessel according to claim 1, wherein each of perforations which are provided on the food supporting plate is 1.8 mm in diameter.

6. The cooking vessel according to claim 2, wherein the interval between the edge of said food supporting plate and the lower edge of the lid is set to 5 mm or less.

7. The cooking vessel according to claim 1, wherein each of the perforations which are provided on the food supporting plate is 1.8 mm×9 mm in size.

8. A cooking vessel used with microwave ovens, comprising:

a lower body containing water therein, and designed to allow microwaves to penetrate the lower body;

a food supporting plate provided in the lower body in such a way as to be spaced apart from a bottom of the lower body, and designed to allow steam to penetrate the food supporting plate but prevent microwaves from penetrating the food supporting plate;

a lid engaged with the lower body to define a cooking space along with the food supporting plate, and designed to prevent microwaves from penetrating the lid; and a microwave penetrating part provided on the lower body between the lid and the food supporting plate.

* * * * *